Aug. 7, 1928.
J. S. LAWSON
1,680,053
CLAMP FOR ELECTRICAL CONDUCTORS
Filed Jan. 26, 1927
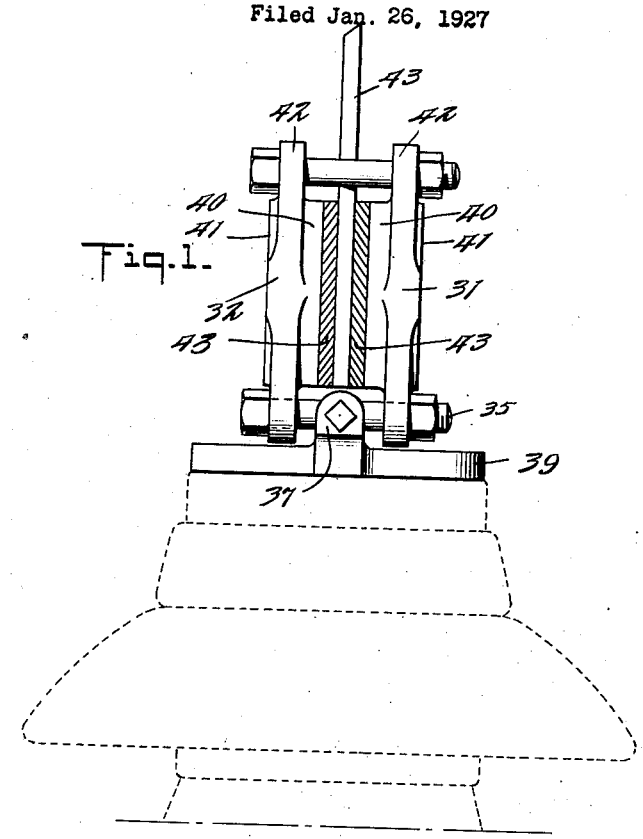
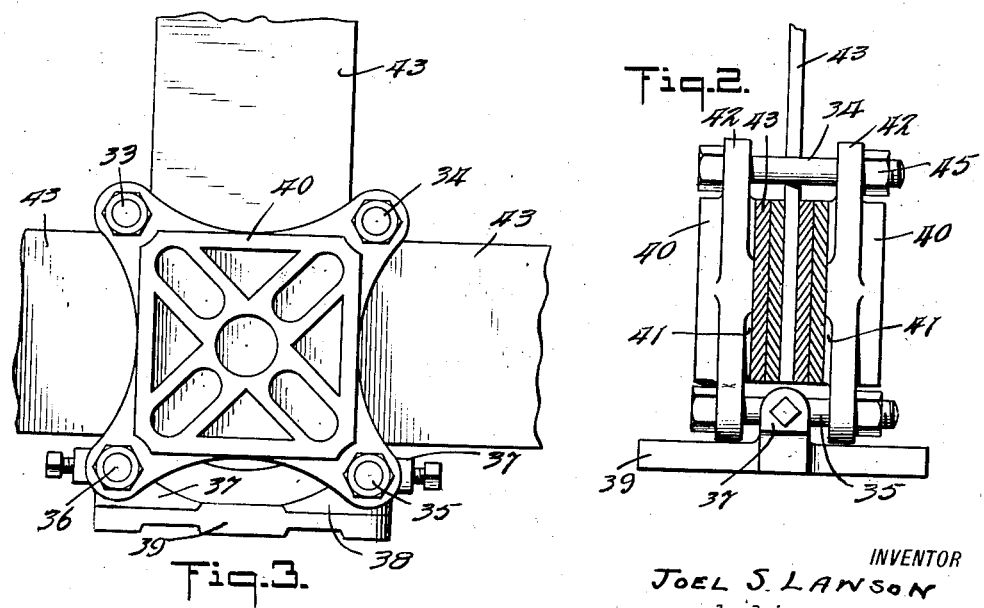
INVENTOR
JOEL S. LAWSON
by his attorneys Patented Aug. 7, 1928.

1,680,053

UNITED STATES PATENT OFFICE.

JOEL S. LAWSON, OF ST. JAMES, NEW YORK, ASSIGNOR TO MEMCO ENGINEERING & MANUFACTURING COMPANY, INC., OF LONG ISLAND CITY, NEW YORK, A CORPORATION OF NEW YORK.

CLAMP FOR ELECTRICAL CONDUCTORS.

Application filed January 26, 1927. Serial No. 163,766.

My invention relates to clamps for electrical bus bars, and the object of my invention is to provide a clamp which is not only adapted to grip bus bars of different thickness or a different number of bus bars, but also to maintain the clamping bolt abutments spaced a substantially uniform distance apart regardless of the thickness of the bus bars, so that the cost of the clamping bolts is reduced and the appearance of the clamp unit improved.

In the accompanying drawings—

Fig. 1 is a side elevation of a clamp embodying my invention, with the clamp plates engaging conductors of the bus bar type, a group of three buses being here indicated;

Fig. 2 is a similar view showing the position of the clamp plates when engaged with a larger group of bus bars; and Fig. 3 is an elevation at right angles to Fig. 2.

As shown in the drawings, the clamping plates 31 and 32 are arranged in vertical position and are directly engaged only by the clamping bolts 33, 34, 35, 36, the latter two passing through lugs 37 and 38 on the clamp base 39. The bus-engaging bosses 40 and 41 upon the opposite faces of each of the clamps 31 and 32, project unequally beyond the mid-plane of the plates 31 and 32. The bosses 40 exceed materially the depth, horizontally, of the bosses 41. The abutment lugs 42 lie in the place of each clamp plate, and are pierced to receive the clamping bolts 33 to 36 inclusive.

When the bus bars 43 to be engaged between the clamp plates are few in number, for example three, as indicated in Fig. 1, the heavy bosses 40 are faced toward each other. When the bus bars 32 are numerous or are thicker, then one or both plates are reversed in position so that the bosses 41 are faced toward each other. By thus reversing the position of the clamping jaws with respect to each other, or one with respect to the other, depending upon the number or thickness of the bus bars to be engaged therebetween, the abutment lugs 42 of the plates are spaced a substantially uniform distance apart, regardless of the spacing of the engaging surfaces of the clamp jaws. Consequently, the draw-up bolts 34 may be threaded for only a short distance, and the draw-up nuts 45 occupy a substantially uniform position thereon, regardless of the spacing between the bus-bar engaging surfaces.

I claim—

1. In a bus bar clamp for bus bars of rectangular cross-section, a reversible clamping plate having abutments for engagement by a draw-up member, and flat bus-bar engaging surfaces on the opposite faces of said plate, said surfaces being spaced unequally from the planes of said abutments for the purpose specified.

2. A bus bar clamp for bus bars of rectangular cross-section, comprising a pair of clamping plates, each plate being reversible and having a thick boss on one side thereof and a thin boss on the other side thereof, and lugs extending from the plates, said lugs having apertures for the reception of clamping bolts.

In testimony whereof I have signed my name to this specification.

JOEL S. LAWSON.